(12) United States Patent
Carr et al.

(10) Patent No.: US 10,850,858 B2
(45) Date of Patent: Dec. 1, 2020

(54) BREAKAWAY COVER FOR EMERGENCY ACCESS

(71) Applicant: Bell Helicopter Textron Inc., Fort Worth, TX (US)

(72) Inventors: Timothy Brian Carr, Grapevine, TX (US); Chad Richard Haugeberg, Arlington, TX (US); Deepak Chandrashekar Jangamakote, Bangalore (IN)

(73) Assignee: Textron Innovations Inc., Providence, RI (US)

( * ) Notice: Subject to any disclaimer, the term of this patent is extended or adjusted under 35 U.S.C. 154(b) by 399 days.

(21) Appl. No.: 15/636,368

(22) Filed: Jun. 28, 2017

(65) Prior Publication Data

US 2019/0002112 A1 Jan. 3, 2019

(51) Int. Cl.
| | |
|---|---|
| *B64D 25/16* | (2006.01) |
| *B64D 25/14* | (2006.01) |
| *B64D 11/06* | (2006.01) |
| *B64C 1/14* | (2006.01) |

(52) U.S. Cl.
CPC ............ *B64D 25/16* (2013.01); *B64C 1/1407* (2013.01); *B64D 11/0633* (2014.12); *B64D 25/14* (2013.01)

(58) Field of Classification Search
CPC .... B64D 25/14; B64D 25/16; B64D 11/0633; B64C 1/1407; B63C 9/23
See application file for complete search history.

(56) References Cited

U.S. PATENT DOCUMENTS

| | | | | |
|---|---|---|---|---|
| 3,469,713 A | * | 9/1969 | Edwards ................ | A63H 19/18 213/75 TC |
| 6,659,404 B1 | * | 12/2003 | Roemke ................ | B64D 25/14 137/224 |
| 6,694,903 B1 | * | 2/2004 | Chen ...................... | D05B 65/00 112/298 |
| 7,380,755 B2 | * | 6/2008 | Matsch ................. | B64C 1/1423 244/137.2 |
| 9,238,508 B2 | | 1/2016 | Lafon et al. | |
| 9,302,569 B2 | * | 4/2016 | Ogino .................... | B60J 5/0418 |
| 9,476,251 B2 | * | 10/2016 | Olch ....................... | B63B 19/26 |

(Continued)

FOREIGN PATENT DOCUMENTS

| | | |
|---|---|---|
| EP | 3037342 A1 | 6/2016 |
| WO | 2013119713 A1 | 8/2013 |

OTHER PUBLICATIONS

European Search Report in related European Application No. 18171731.5 dated Oct. 18, 2018, 4 pages.

(Continued)

*Primary Examiner* — Katherine W Mitchell
*Assistant Examiner* — Candace L Bradford
(74) *Attorney, Agent, or Firm* — Lightfoot & Alford PLLC

(57) ABSTRACT

A breakaway cover for providing emergency access to a release mechanism for a life raft on a vehicle includes a housing configured to be attached the vehicle. The housing includes a recess wherein the release mechanism may be located. The recess is protected by a cover. The cover has a first end attached the housing and a second end retained to the housing but capable of being pulled free. The cover is configured to fracture along a series of slots proximate the first end when pulled by a user.

14 Claims, 6 Drawing Sheets

(56) References Cited

U.S. PATENT DOCUMENTS

| | | | |
|---|---|---|---|
| 2006/0266888 A1 | 11/2006 | Matsch | |
| 2007/0187551 A1* | 8/2007 | Myers | F16K 5/0605 |
| | | | 244/129.4 |
| 2007/0199188 A1* | 8/2007 | Barker | B64C 1/1446 |
| | | | 29/33.2 |
| 2007/0204530 A1* | 9/2007 | Janesky | E02D 19/00 |
| | | | 52/169.14 |
| 2007/0216170 A1* | 9/2007 | Drescher | E05B 83/16 |
| | | | 292/201 |
| 2009/0294591 A1* | 12/2009 | Ramirez Blanco | B64C 1/1446 |
| | | | 244/129.4 |
| 2018/0195324 A1* | 7/2018 | Amante | E05C 9/00 |
| 2019/0001995 A1* | 1/2019 | Bourbon | B61B 1/02 |

OTHER PUBLICATIONS

Penate, Alfredo; "Cockpit evac with rope"; Feb. 13, 2009; XP054978279; Retrieved from Internet: URL:http://www.youtube.com/watch?v=_YZGH89WcPc (retrieved on Apr. 20, 2018) *See video footage from 0:31 to 0:47*.

European Exam Report in related European Application No. 18171731.5 dated Nov. 27, 2018, 6 pages.

European Exam Report in related European Application No. 18171731.5 dated Mar. 7, 2019, 4 pages.

\* cited by examiner

BREAKAWAY COVER FOR EMERGENCY ACCESS

BACKGROUND

Aircraft that fly over water should be equipped with an emergency life raft for use if ditching over the water is necessary. Aircraft equipped with an emergency life raft should include a manual release mechanism providing access to the life raft from the exterior of the aircraft. While it is imperative that the manual release is easily accessible and easily operable in the event of an emergency, it is also imperative that the release mechanism is shielded from inadvertent actuation thereof. Similarly, aircraft also include various emergency equipment inside the fuselage that may utilize a manual release mechanism that should be both easily accessible and easily actuated while being protected from accidental actuation.

SUMMARY

The embodiments of this disclosure provide a housing with a recess in which a release mechanism is secured. The release mechanism is then protected from inadvertent actuation by the attachment of a cover over the recess. The cover includes one or more features that enable the cover to be quickly and easily removed from the housing, thereby exposing the release mechanism for actuation thereof, and providing emergency access.

BRIEF DESCRIPTION OF THE DRAWINGS

The accompanying drawings, which are incorporated in and constitute a part of the specification, illustrate preferred embodiments of the invention and, together with the description, serve to explain the objects, advantages, and principles of the invention.

DETAILED DESCRIPTION

It should be understood that although an illustrative implementation of one or more embodiments are provided below, the disclosed systems and methods may be implemented using any number of techniques, whether currently known or in existence. This disclosure should in no way be limited to the illustrative implementations, drawings, and techniques illustrated below, including the exemplary designs and implementations described herein, but may be modified with the scope of the appended claims along with their full scope of equivalents.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc., and the components thereof described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
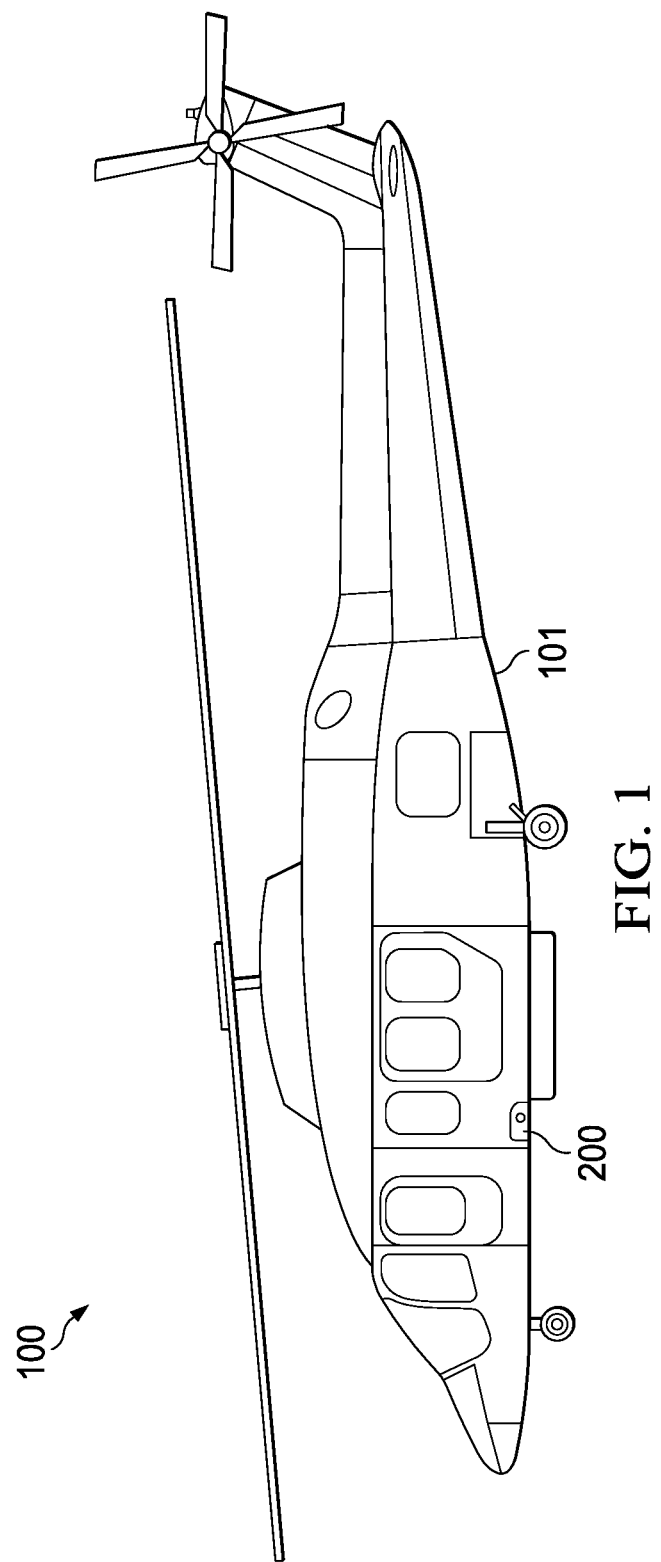
FIG. 1 is a side view of a rotorcraft including an apparatus for emergency life raft access according to an embodiment of this disclosure.

Referring to FIG. 1, a rotorcraft 100 is illustrated. The rotorcraft 100 includes a fuselage 101. Mounted to the fuselage 101 is a life raft access apparatus 200. As shown in FIG. 1, it is preferable, although not necessary, to locate the access apparatus 200 proximate the bottom of the fuselage 101. This makes deployment of the life raft easier for someone who has already departed the rotorcraft 100 following an emergency water landing.

Figure 2:
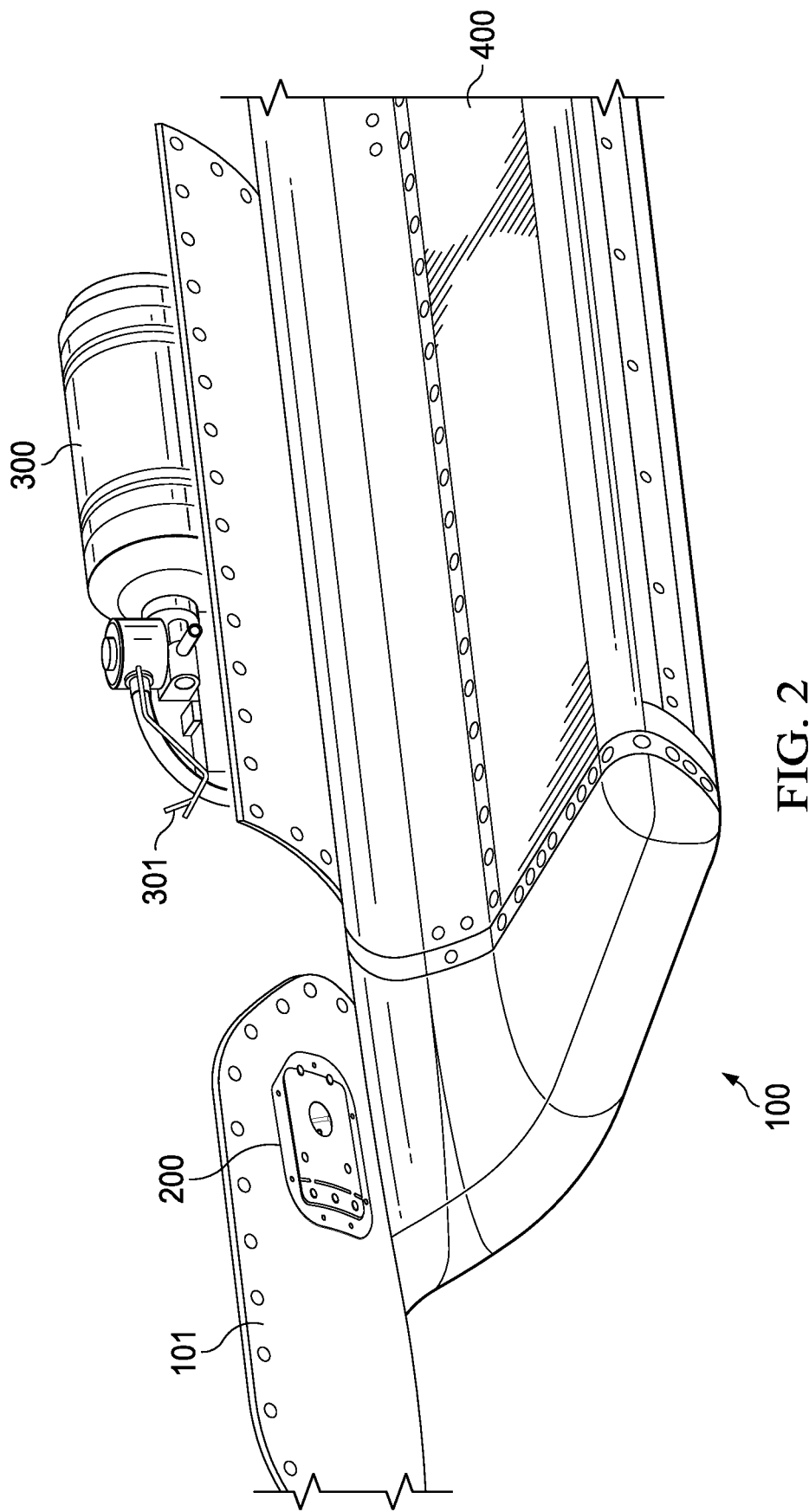
FIG. 2 is a perspective view of a portion of a rotorcraft showing an apparatus for emergency life raft access according to an embodiment of this disclosure.

Referring to FIG. 2, access apparatus 200 is conveniently located adjacent to a passenger door access step 400. FIG. 2 also shows a compressed air tank 300 located within the fuselage 101 behind the step 400. The compressed air tank 300 may be connected to the life raft (not shown, but stored within the fuselage or the step 400 or a container mounted to the aircraft) via tubing 301. Within the access apparatus 200 is the release mechanism. Actuating the release mechanism may automatically deploy and inflate the life raft utilizing the air from the compressed air tank 300. Alternatively, actuating the release mechanism may permit the user to access the life raft and a separate mechanism may initiate the inflation of the life raft.

Figure 3:
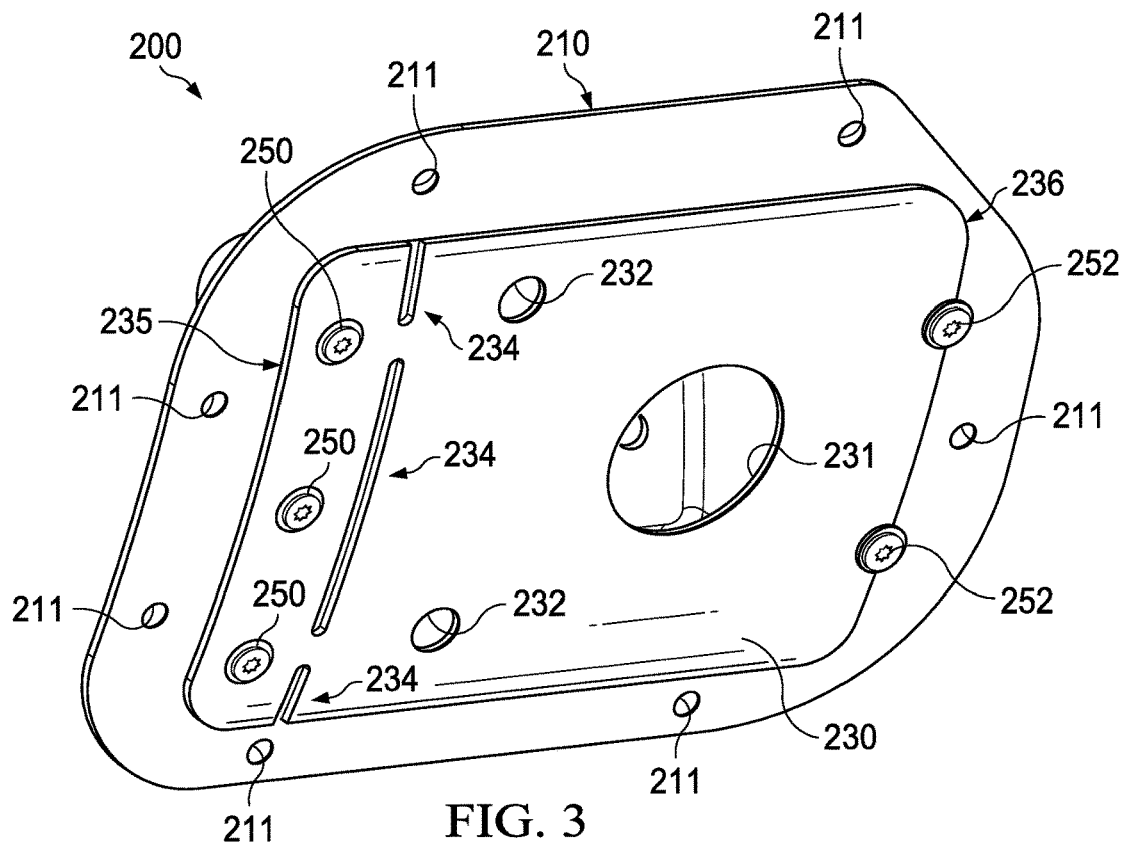
FIG. 3 is a perspective view of an apparatus for emergency life raft access according to an embodiment of this disclosure.
Figure 4:
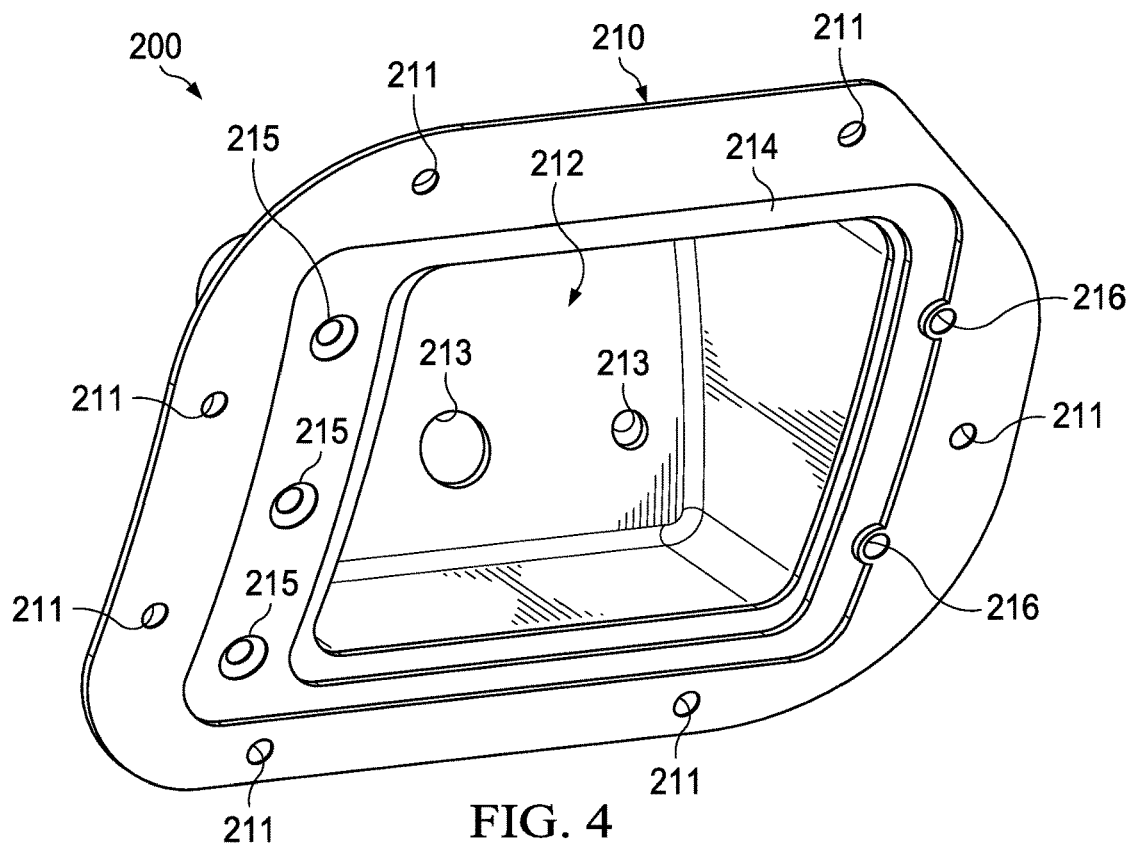
FIG. 4 is a perspective view of a housing of an apparatus for emergency life raft access according to an embodiment of this disclosure.

Referring to FIGS. 3-6, the access apparatus 200 includes a housing 210, a cover 230, fasteners 250, and retainers 252. As shown in FIG. 4, the housing 210 includes a plurality of openings 211 to facilitate attachment of the housing 210 to the fuselage 101. The housing 210 includes a recess 212 configured to accommodate a manual release mechanism (not shown) and space for proper ergonomic operation. The housing 210 also includes one or more openings 213 which enable the connection of the release mechanism to the activation system behind the housing 210 which facilitates the deployment of the life raft. The release mechanism may include a handle that is actuated by a pulling, rotating, or pushing motion. Actuation of the release mechanism may simply release a portion of the fuselage 101, enabling the user to retrieve the life raft which could be tethered to the aircraft. Alternatively, actuating the release mechanism may cause the life raft to be ejected from the storage compartment and automatically inflated. The housing 210 further includes a depression 214 that surrounds the recess 212. The shape of the perimeter of the depression 214 matches the shape of the perimeter of the cover 230, wherein the perimeter of the depression 214 is slightly larger so that the cover 230 may be received in the depression 214. In addition, the depth of the depression 214 closely matches the depth of the cover 230 to create a uniform surface of the fuselage 101 when the access apparatus 200 is installed thereon, thereby providing a clean aerodynamic profile. The housing 210 also includes a plurality of openings 215 located along a first end of the depression 214 configured to receive fasteners 250 therein to attach the cover 230 thereto. The housing 210 also includes a plurality of openings 216 located at an opposite end of the housing 210 from openings 215. The openings 216 are configured to receive retainers 252 therein to retain the cover 230 within the depression 214.

As shown in FIG. 3, the cover 230 also includes drainage holes 232, slots 234, and a grip 231. The slots 234 are located along a line proximate a first end 235 of the cover 230. The cover 230 is made of a material that will flex when a user pulls on the grip 231. When the cover 230 flexes as the pulling force is applied to grip 231, the second end 236 is configured to slide out from underneath the retainers 252. After the cover 230 is pulled from under the retainers 252, the cover 230 will rotate about the line of slots 234. As the cover 230 rotates about the line of slots 234, the cover 230 will fracture along the line of the slots 234 and the free portion can be discarded so the user may operate the life raft release within the recess 212 of the housing 210. The cover 230 is constructed of a material that will not leave a sharp edge when it fractures along the line of the slots 234. It should be noted that the breakaway function facilitated by the slots 234 may be facilitated by other patterns of openings or other structures. For example, the slots 234 may be replaced by a living hinge designed to fail when rotated to a predetermined angle. The number, shape, and size of the slots 234 may be altered to create the desired fracture force required.

It should be appreciated that alternative methods of connection and separation of the cover 230 from the housing 210 are contemplated. For example, both the first and second ends 235, 236 of the cover 230 may be attached to the housing 210 with the fasteners 250 and the cover 230 may include two sets of the slots 234, one proximate each end. In this configuration, it may be preferable for the grip 231 to be located at the top or bottom of the cover 230. Moreover, the slots 234 and the fasteners 250 may be omitted in favor of retainers 252 on both sides of the cover 230. In this configuration, the first and second ends 235, 236 of the cover 230 would slide out from under the retainers 252. Alternatively, the slots 234 and the fasteners 250 may be omitted in favor of a slot (not shown) on the housing 210 that receives and holds the first end 235 of the cover 230 therein. After the second end 236 of the cover 230 is pulled clear of the retainers 252, the first end 235 is free to be pulled from the slot 234. Alternatively, the retainers 252 could be omitted instead. In this configuration, the second end 236 would be pulled from a slot 234 as the cover 230 deflects. After the second end 236 clears the slot, the cover 230 would fracture along the line of slots 234. Alternatively, the slots 234, the fasteners 250, and the retainers 252 could be omitted in favor of grooves at both ends of the housing 210. In this configuration, a groove on each opposing end of the depression 214 could receive the first and second ends 235, 236 of the cover 230 therein. In such a configuration, when grip 231 is pulled the flexion of the cover 230 would allow the first and second ends 235, 236 of the cover 230 to be pulled from the slots 234, thereby uncovering the release mechanism. It should also be appreciated that while the grip 231 is shown as an opening, the grip 231 could comprise any structure suitable for grabbing and pulling by a user. For example, the grip 231 could be a knob, a bar, or a depression with a lip.

Figure 5:
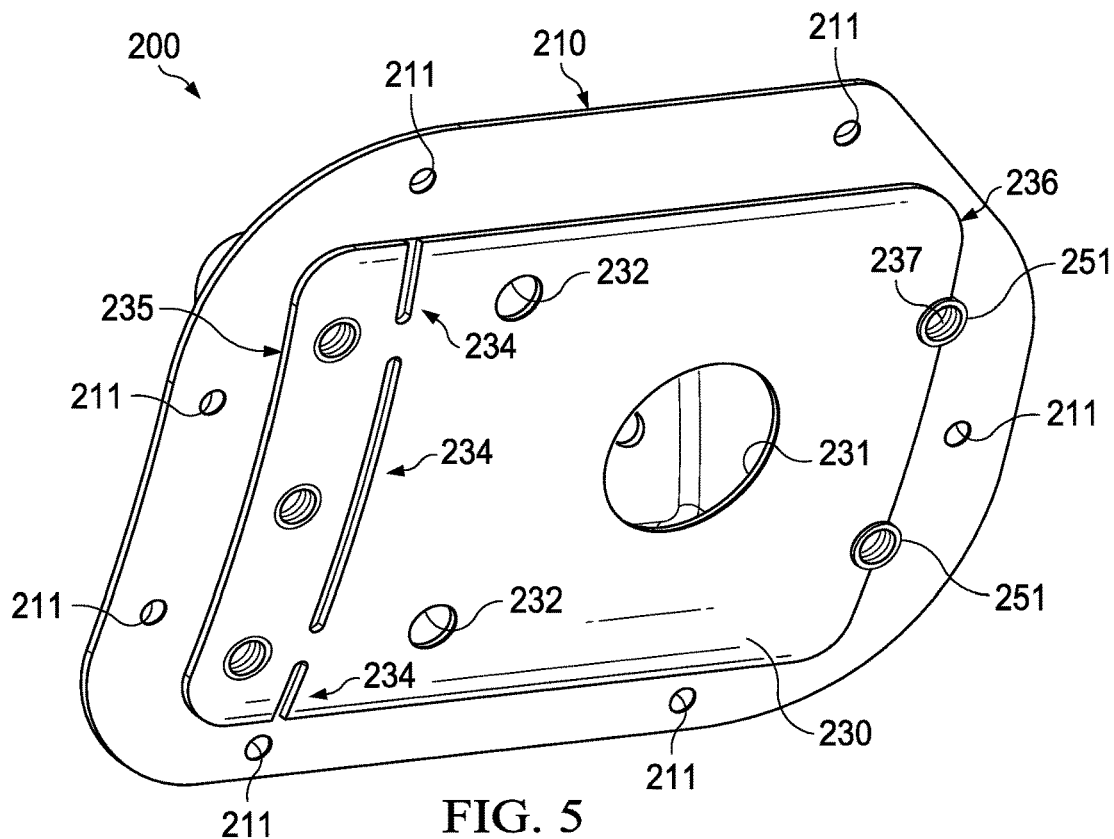
FIG. 5 is a perspective view of a portion of an apparatus for emergency life raft access according to an embodiment of this disclosure.
Figure 6:
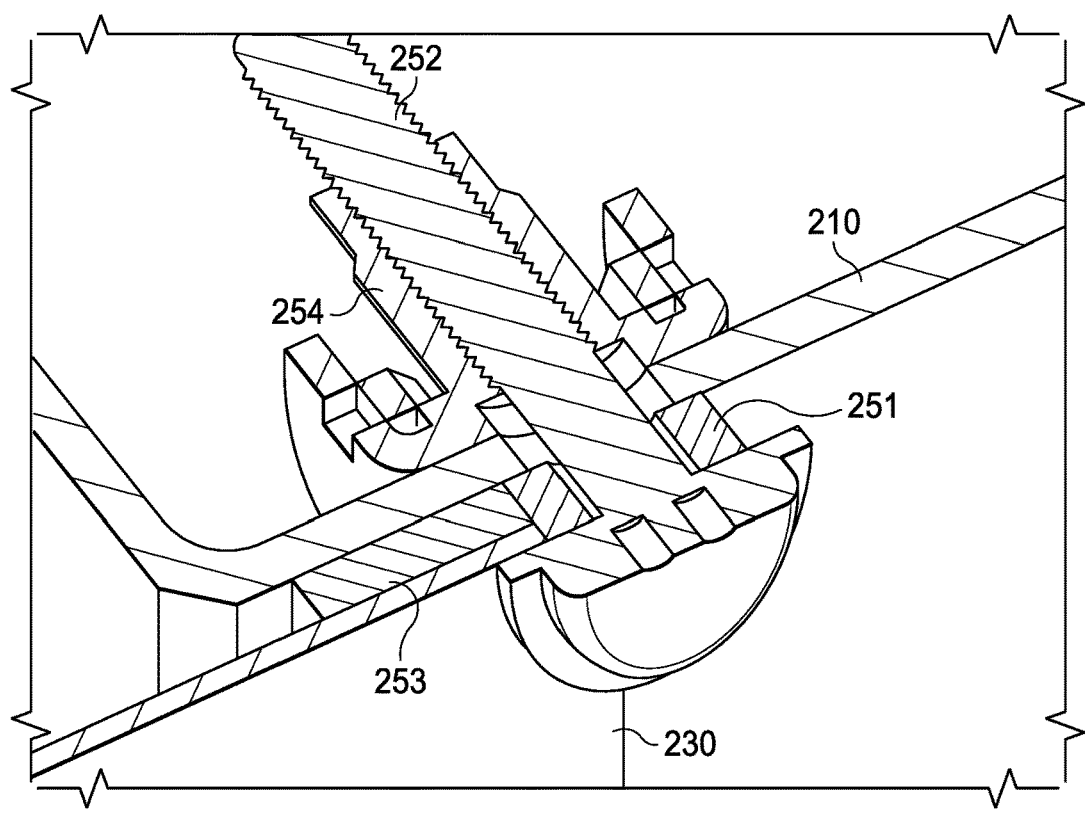
FIG. 6 is a cross-sectional perspective view of a portion of an apparatus for emergency life raft access according to an embodiment of this disclosure.

FIGS. 5 and 6 show the structure that enables the retainers 252 to hold the second end 236 of the cover 230 in place while still allowing it to slide out from under the retainers 252 when grip 231 is pulled by a user. This is accomplished by a spacer 251 which limits the amount of clamping force that can be applied to the cover 230 between the housing 210 and the retainer 252. Alternatively, a shouldered fastener or retainer could be used to limit the clamping force or the spacer could be integral with the housing 210. A compressible pad 253 may be located adjacent to the retainers 252. The uncompressed height of the pad 253 plus the depth of the cover 230 should be greater than the height of the spacer 251. However, the pad 253 should only be partially compressed when the cover 230 and the pad 253 are clamped between the retainer 252 and the housing 210. Such a configuration will permit the retainers 252 to slightly compress the pad 253, providing a tight vibration free fit while still allowing the second end 236 of the cover 230 to slide out from under the retainers 252 when the grip 231 is pulled. Alternatively, pad 253 could be extended around the perimeter of the interior surface of the cover 230 to form a seal. It should be noted that this capability can be accomplished without the use of the spacers 251. If the housing 210 includes the depression 214, and the depression 214 intersects the openings 216, the spacer 251 is not required. In this configuration, as long as the depth of the depression 214 is the same as the height of the omitted spacer 251, the same capabilities will be achieved.

Figure 7:
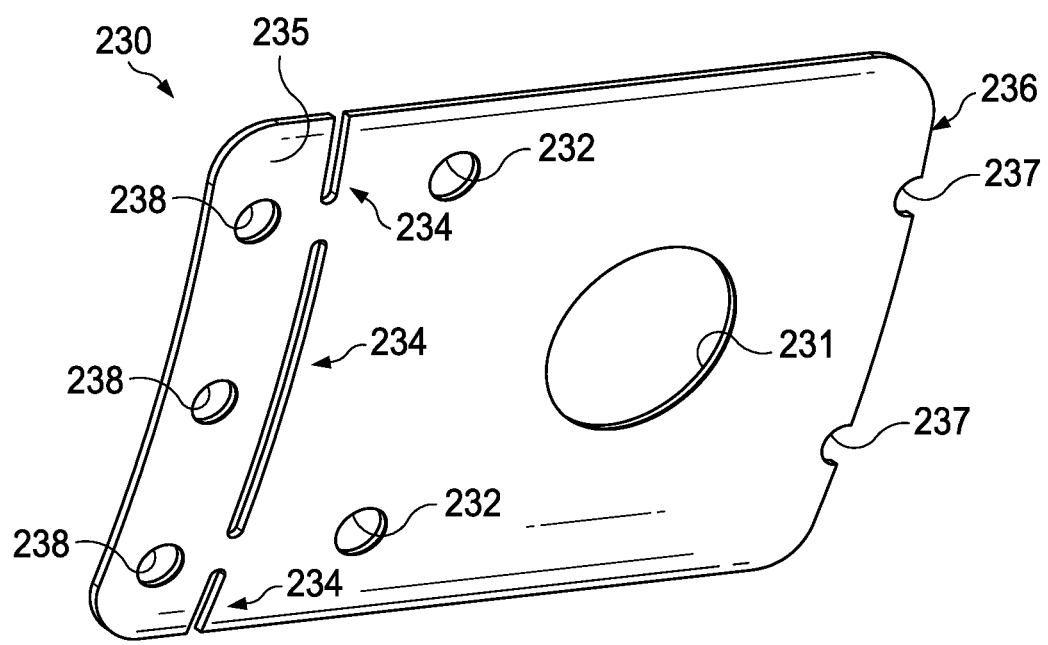
FIG. 7 is a perspective view of a cover of an apparatus for emergency life raft access according to an embodiment of this disclosure.

FIG. 7 shows the cover 230 unaccompanied by any other hardware. FIG. 7 provides an illustration of the openings 238 through the first end 235 which are configured to receive the fasteners 250 therethrough and affix the first end 235 to the housing 210. FIG. 7 also shows notches 237 provided in the second end 236. The notches 237 include radii that are configured to receive the spacers 251 and/or the retainers 252 therein.

Figure 8:
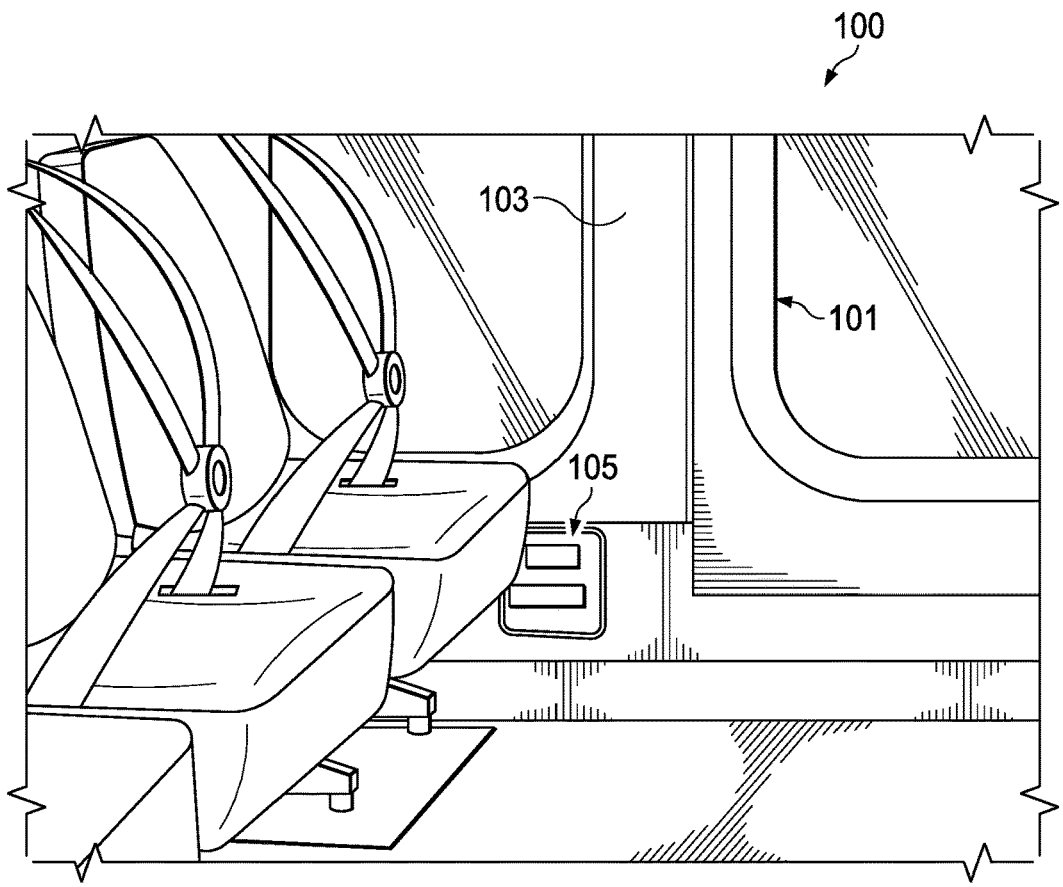
FIG. 8 is a perspective view of a portion of an interior of a rotorcraft showing an emergency access apparatus according to this disclosure.

FIG. 8 shows an interior 103 of fuselage 101 of rotorcraft 100. An emergency access apparatus 105 is attached to the interior 103. Similar to the access apparatus 200, the access apparatus 105 provides quick access to an emergency actuation device, while protecting the emergency actuation device from accidental actuation thereof.

Figure 9:
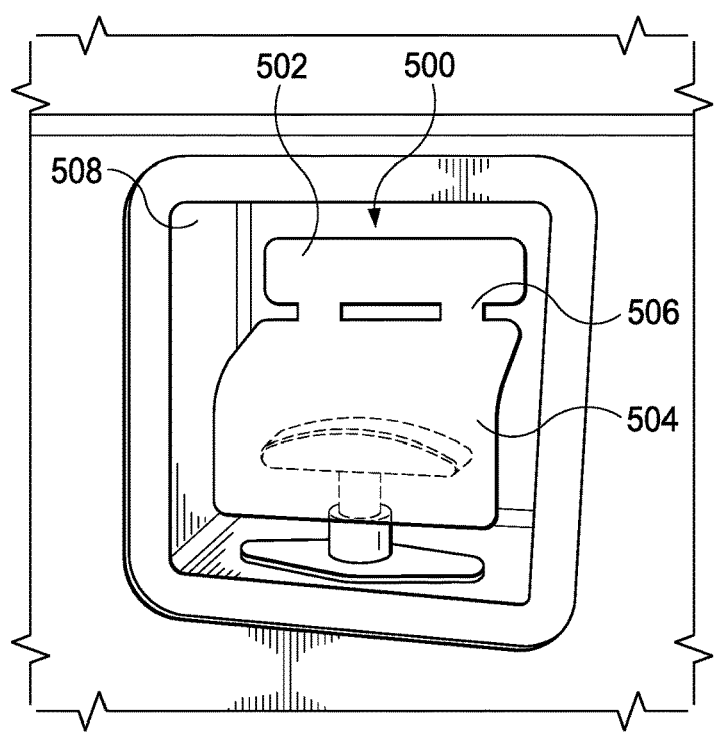
FIG. 9 is a perspective view of an emergency access apparatus according to this disclosure.

FIG. 9 shows an internal access cover 500 which also provides protected access to an emergency actuation device. The internal access cover 500 includes a first portion 502 connected to a second portion 504 via a frangible hinge 506. The first portion 502 is attached to an interior surface 508 of a rotorcraft. Attachment of the first portion 502 may be accomplished using screws (not shown) or any other device for physical attachment. The second portion 504 need not be attached to the interior surface 508 of the rotorcraft. However, the second portion 504 may be removably secured in order to attenuate vibration thereof. In addition, the hinge 506 need not be frangible. The hinge 506 may instead be plastically deformable such that when the second portion 504 is rotated about the hinge 506, the second portion 504 is retained in the position to which it was rotated. The internal access cover 500 may be used anywhere inside any vehicle or structure which may benefit from the ability to provide rapid but protected access.

While the above disclosure describes using the emergency access apparatus with a rotorcraft, it should be noted that the emergency access apparatus may be utilized to provide protected access to any emergency equipment in any setting. For example, in any building or vehicle, the emergency access apparatus could be used to provide protected access to an emergency exit release, a fire extinguisher, an emergency oxygen supply, an automated external defibrillator, a decontamination kit, or a first aid kit.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An apparatus for enabling emergency access to a release mechanism for a life raft on a vehicle, the apparatus comprising:
   a housing configured for attachment to the vehicle, the housing including a recess configured to contain the release mechanism therein, the recess having a height and a width perpendicular to the height;
   a cover configured for attachment to the housing, the cover including a perimeter, wherein the perimeter includes a notch, the cover further including a grip, the cover having a height that is greater than the height of the recess and a width that is greater than the width of the recess, a line of slots located proximate to a first end of said cover; and
   a retainer including a head, a shaft, and a longitudinal axis, wherein a dimension of the retainer transverse to the longitudinal axis is larger at the head than at the shaft, the shaft being configured to be received at least partially within the notch and the head being configured to cover at least a portion of the perimeter;
   wherein the cover is configured to deflect and rotate along the line of slots in response to a force being applied to the grip such that the perimeter of the cover slides from under the head of the retainer providing access to the recess of the housing.

2. The apparatus of claim 1, wherein the cover includes one or more openings along a line extending from a first edge of the cover to a second edge of the cover.

3. The apparatus of claim 2, wherein the cover is configured to fracture along the line of one or more openings when the force is applied to the grip.

4. The apparatus of claim 3, further comprising an opening in the cover configured to receive a fastener therethrough, wherein the notch and the opening are located on opposing sides of the line of openings.

5. The apparatus of claim 4, further comprising a spacer configured to receive the retainer therethrough, the spacer including an outer surface configured to be received within the notch, the spacer having a height that is greater than a depth of the cover.

6. The apparatus of claim 5, further comprising a compressible pad adjacent the notch, wherein a combined uncompressed depth of the cover and the pad is greater than the height of the spacer.

7. The apparatus of claim 1, wherein the housing includes a depression surrounding the recess, wherein the depression is configured to receive the cover therein.

8. The apparatus of claim 1, wherein the grip comprises one of a hole, a knob, a bar, or a depression with a lip.

9. An apparatus for enabling emergency access to a release mechanism for a life raft on a vehicle, the apparatus comprising:
   a housing configured for attachment to the vehicle via a plurality of attachment openings, the housing including a recess configured to contain the release mechanism therein;
   a cover configured for attachment to the housing, the cover including a perimeter, the perimeter including two notches, the cover further including a grip, a plurality of slots located proximate to a first end of said cover; and
   two retainers, each retainer including a head, a shaft, and a longitudinal axis, wherein a dimension of the fastener transverse to the longitudinal axis is larger at the head than at the shaft, the shaft of each of the retainers being configured to be received at least partially within one of the notches and the heads of the two retainers being configured to cover at least a portion of the perimeter;
   wherein the cover is configured to deflect and rotate along the line of slots in response to a force being applied to the grip such that the perimeter of the cover slides from under the heads of the two retainers providing access to the recess of the housing.

10. The apparatus of claim 9, further including two spacers, each spacer being configured to receive one of the two retainers therethrough, each spacer including an outer surface configured to be received within one of the two notches, each spacer having a height that is greater than a depth of the cover.

11. The apparatus of claim 10, further comprising a compressible pad adjacent the notches, wherein a combined uncompressed depth of the cover and the pad is greater than the height of the spacers.

12. The apparatus of claim 11, wherein the grip comprises one of a hole, a knob, a bar, or a depression with a lip.

13. The apparatus of claim 12, wherein the cover includes a hinge about which the cover is configured to fracture.

14. The apparatus of claim 9, wherein the housing includes a depression surrounding the recess, wherein the depression is configured to receive the cover therein.

\* \* \* \* \*